US011942706B2

(12) United States Patent
Kaushal et al.

(10) Patent No.: US 11,942,706 B2
(45) Date of Patent: Mar. 26, 2024

(54) ANTENNA WITH RADIATION ELEMENT HAVING NON-UNIFORM WIDTH PART

(71) Applicant: FUJIKURA LTD., Tokyo (JP)

(72) Inventors: Shailendra Kaushal, Sakura (JP); Ning Guan, Sakura (JP); Asahi Kan, Sakura (JP)

(73) Assignee: FUJIKURA LTD., Tokyo (JP)

(*) Notice: Subject to any disclaimer, the term of this patent is extended or adjusted under 35 U.S.C. 154(b) by 204 days.

(21) Appl. No.: 17/430,811

(22) PCT Filed: Jul. 8, 2020

(86) PCT No.: PCT/JP2020/026674
§ 371 (c)(1),
(2) Date: Aug. 13, 2021

(87) PCT Pub. No.: WO2021/020057
PCT Pub. Date: Feb. 4, 2021

(65) Prior Publication Data

US 2022/0029294 A1 Jan. 27, 2022

(30) Foreign Application Priority Data

Jul. 29, 2019 (JP) ................................ 2019-138885

(51) Int. Cl.
*H01Q 9/28* (2006.01)
*H01Q 9/04* (2006.01)
(Continued)

(52) U.S. Cl.
CPC ............... *H01Q 9/045* (2013.01); *H01Q 9/28* (2013.01); *H01Q 9/40* (2013.01); *H01Q 21/08* (2013.01); *H01Q 21/29* (2013.01)

(58) Field of Classification Search
CPC ............ H01Q 9/045; H01Q 9/28; H01Q 9/40; H01Q 21/08; H01Q 21/29
(Continued)

(56) References Cited

U.S. PATENT DOCUMENTS

2007/0290939 A1* 12/2007 Teshirogi ............ H01Q 19/108 343/700 MS
2010/0238084 A1 9/2010 Deng et al.

FOREIGN PATENT DOCUMENTS

CN 101208831 A 6/2008
CN 204118260 U 1/2015
(Continued)

OTHER PUBLICATIONS

International Search Report dated Oct. 6, 2020, issued in counterpart application No. PCT/JP2020/026674, w/ English translation (7 pages).
(Continued)

*Primary Examiner* — Peguy Jean Pierre
(74) *Attorney, Agent, or Firm* — WHDA, LLP

(57) ABSTRACT

An antenna includes a dielectric layer, a conductive ground layer formed on a first main surface of the dielectric layer, and radiation elements formed on a second main surface of the dielectric layer and are conductive. The first radiation element includes a first non-uniform width part that has a width in a direction parallel to a first side in a linear shape opposed to a first vertex, and the width of the first non-uniform width part gradually decreases in a direction from the first side to the first vertex. The second radiation element includes a second non-uniform width part that has a width in a direction parallel to a second side in a linear shape opposed to a second vertex, and the width of the second non-uniform width part gradually decreases in a direction from the second side to the second vertex.

10 Claims, 10 Drawing Sheets

(51) Int. Cl.
*H01Q 9/40* (2006.01)
*H01Q 21/08* (2006.01)
*H01Q 21/29* (2006.01)

(58) Field of Classification Search
USPC .................................................... 343/700 R
See application file for complete search history.

(56) References Cited

FOREIGN PATENT DOCUMENTS

| | | | |
|---|---|---|---|
| CN | 104871368 | A | 8/2015 |
| CN | 107026322 | A | 8/2017 |
| CN | 207967300 | U | 10/2018 |
| CN | 109728431 | A | 5/2019 |
| JP | 2007-142974 | A | 6/2007 |
| JP | 2008-199371 | A | 8/2008 |
| JP | 2017-046107 | A | 3/2017 |
| KR | 20110076528 | A | 7/2011 |
| TW | I577083 | B | 4/2017 |

OTHER PUBLICATIONS

Weinschel et al., "A Cylindrical Array of Circularly Polarized Microstrip Antenna", 1975 Antennas and Propagation Society International Symposium, 1975, pp. 177-180, cited in ISR (4 pages).
Joshi et al., "Edge Perturbation Effect in Polygonal Patch Antennas", 2015 International Conference on Signal Processing, Computing and Control (ISPCC), 2015, pp. 97-101, cited in ISR (6 pages).
Hirano et al., "4 x 4 Pentagonal Patch Array Antenna for Breast Cancer Detection", 2016 IEEE Conference on Antenna Measurements & Applications (CAMA), 2016, cited in ISR (3 pages).
Lopes et al., "Design and Simulation of Frequency Reconfigurable Microstrip Patch Antenna for C band and X band Applications", 2017 International Conference on Computing, Communication, Control and Automation (ICCUBEA), 2017, cited in ISR (7 pages).
Office Action dated Nov. 14, 2023, issued in counterpart CN application No. 202080014959.4. (4 pages).

* cited by examiner

ANTENNA WITH RADIATION ELEMENT HAVING NON-UNIFORM WIDTH PART

TECHNICAL FIELD

The present disclosure relates to an antenna.

BACKGROUND ART

Patent Literature 1 discloses an array antenna of a direct feeding system and a coplanar feeding system. The direct feeding system refers to a feeding system in which a feed line is directly connected to an antenna element. The coplanar feeding system refers to a feeding system in which a feed line and an antenna element are formed on a common plane.

As described in Patent Literature 1, a conductive ground layer is formed on one of surfaces of a dielectric substrate, and a plurality of antenna elements and a plurality of feed lines are formed on the other surface of the dielectric substrate. The plurality of antenna elements are linearly aligned, and a feed line extends from each of the antenna elements. Terminals of the feed lines extending from end antenna elements located at both ends of a row of the antenna elements are open, and the end antenna elements are parasitic elements. Terminals of the feed lines extending from middle antenna elements other than the end antenna elements are connected to a transmission and reception circuit, and the middle antenna elements are driven elements. The parasitic elements at the both ends are provided for reducing a difference in directivity of the driven elements.

CITATION LIST

Patent Literature

Patent Literature 1: JP 2017-046107A

SUMMARY OF INVENTION

Technical Problem

Even for a directional antenna that strongly transmits and receives a radio wave in a specific direction, a wide range of a radiation direction in which a radio wave is strongly transmitted and received is preferable.

Thus, the present disclosure has been made in view of the circumstances described above, and an objective thereof is to provide an antenna having a wide range of a radiation direction in which a radio wave can be strongly transmitted and received.

Solution to Problem

A main aspect of the disclosure to achieve the above objective is an antenna comprising: a dielectric layer including a first main surface and a second main surface opposite to the first main surface;

- a conductive ground layer formed on the first main surface;
- a first radiation element that is formed on the second main surface and is conductive; and
- a second radiation element that is formed side by side with the first radiation element on the second main surface and is conductive, wherein
- the first radiation element includes a first non-uniform width part having a width in a direction parallel to a first side in a linear shape opposed to a first vertex part, the width of the first non-uniform width part gradually decreasing in a direction from the first side to the first vertex part, and
- the second radiation element includes a second non-uniform width part having a width in a direction parallel to a second side in a linear shape opposed to a second vertex part, the width of the second non-uniform width part gradually decreasing in a direction from the second side to the second vertex part.

Other features of the present disclosure are made clear by the following description and the drawings.

Advantageous Effects of Invention

With the present disclosure, a range of a radiation direction in which an antenna can strongly transmit and receive a radio wave is wide.

DESCRIPTION OF EMBODIMENTS

Figure 1:
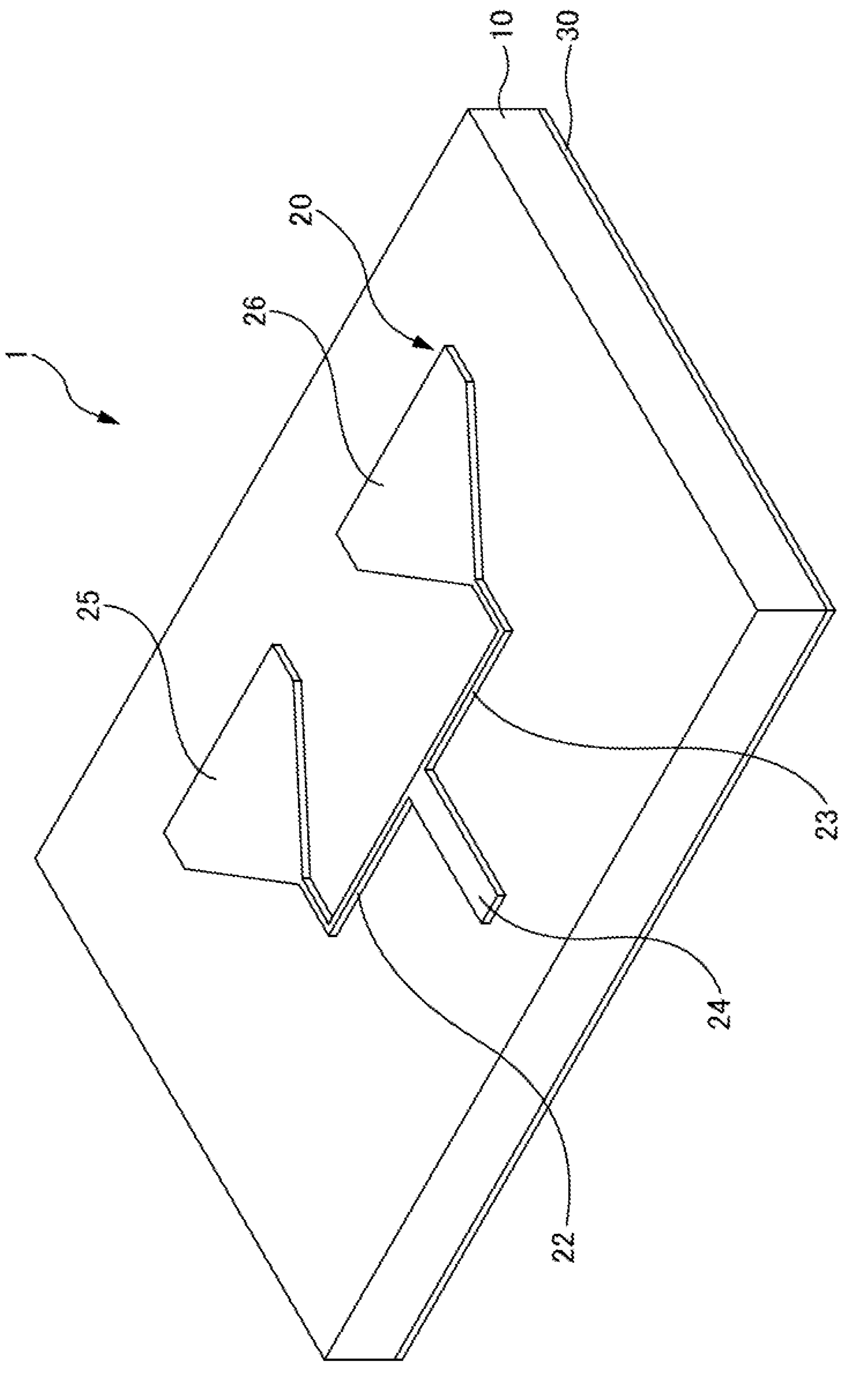
FIG. 1 is a perspective view of an antenna according to a first embodiment.

At least the following matters are made clear from the following description and the drawings.

Disclosed is an antenna including: a dielectric layer including a first main surface and a second main surface opposite to the first main surface; a conductive ground layer formed on the first main surface; a first radiation element that is formed on the second main surface and is conductive; and a second radiation element that is formed side by side with the first radiation element on the second main surface and is conductive, wherein the first radiation element includes a first non-uniform width part having a width in a direction parallel to a first side in a linear shape opposed to a first vertex part, the width of the first non-uniform width part gradually decreasing in a direction from the first side to the first vertex part, and the second radiation element includes a second non-uniform width part having a width in a direction parallel to a second side in a linear shape opposed to a second vertex part, the width of the second non-uniform width part gradually decreasing in a direction from the second side to the second vertex part.

In this way, since the first radiation element including the first non-uniform width part and the second radiation element including the second non-uniform width part are arranged side by side, it is possible to widen a range of a radiation direction in which the antenna can strongly transmit and receive a radio wave.

The first non-uniform width part includes the first vertex part, the first radiation element includes a first uniform width part continuous from the first non-uniform width part toward the first side, the first uniform width part includes the first side, and a width of the first uniform width part is uniform in the direction parallel to the first side, the second non-uniform width part includes the second vertex part, the second radiation element includes a second uniform width part continuous from the second non-uniform width part toward the second side, and the second uniform width part includes the second side, and a width of the second uniform width part is uniform in the direction parallel to the second side.

With this configuration, since the first radiation element includes the first non-uniform width part and the first uniform width part, and the second radiation element next to the first radiation element includes the second non-uniform width part and the second uniform width part, it is possible to further widen a range of a radiation direction in which the antenna can strongly transmit and receive a radio wave.

A side of both side parts of the first non-uniform width part may be formed in a linear shape, and a side of both side parts of the second non-uniform width part may be formed in a linear shape.

Sides of the first non-uniform width part in both side parts may be formed in a curved shape, and sides of the second non-uniform width part in both side parts may be formed in a curved shape.

The first radiation element may have a shape that is line symmetric with respect to a perpendicular line from the first vertex part to the first side, and the second radiation element may have a shape that is line symmetric with respect to a perpendicular line from the second vertex part to the second side.

The second side and the first side may be arranged on a straight line.

The first radiation element and the second radiation element may be symmetrical with respect to a symmetry line located between the first radiation element and the second radiation element and perpendicular to the first side.

The antenna may further include: a first feed line that is formed on the second main surface, extends from the first vertex part, and is conductive; a second feed line that is formed on the second main surface, extends from the second vertex part, is electrically connected to an end portion of the first feed line distal from the first radiation element, and is conductive; and a transmission line that extends from the end portion of the first feed line distal from the first radiation element and an end portion of the second feed line distal from the second radiation element, and is conductive.

The transmission line may extend perpendicularly to the first side from the end portion of the first feed line distal from the first radiation element and the end portion of the second feed line distal from the second radiation element in a direction from the first side to the first vertex part, and the first radiation element and the second radiation element may be line symmetrical with respect to a center line of the transmission line, and the first feed line and the second feed line may be line symmetrical with respect to the center line of the transmission line.

EMBODIMENTS

Embodiments of the present disclosure are described below with reference to the drawings. Note that, although various limitations that are technically preferable for carrying out the present disclosure are imposed on the embodiments to be described below, the scope of the present disclosure is not to be limited to the embodiments and illustrated examples below.

First Embodiment

FIG. 1 is a perspective view of an antenna 1.

The antenna 1 is used for transmitting, receiving, or both transmitting and receiving a radio wave in a frequency band of a microwave or a millimeter wave.

The antenna 1 is a microstrip antenna. The antenna 1 includes a dielectric layer 10, a conductive pattern layer 20 formed on one of main surfaces of the dielectric layer 10, and a conductive ground layer 30 formed on the other main surface of the dielectric layer 10. Here, main surfaces of a layer refer to a surface on a front side of the layer and a surface on an opposite side to the front side. Note that a protective dielectric layer may be formed on one of the main surfaces of the dielectric layer 10 so as to cover the conductive pattern layer 20, and in addition to this or instead of this, a protective dielectric layer may cover the conductive ground layer 30.

The dielectric layer 10 is formed of a resin (e.g., a liquid crystal polymer or a polyimide), a fiber-reinforced resin (e.g., a glass fiber-reinforced epoxy resin, a glass-cloth base material epoxy resin, or a glass-cloth base material polyphenylene ether resin), a fluoropolymer, or a ceramic. The dielectric layer 10 may be a single layer body, or may be a layered body. The dielectric layer 10 may be flexible, or may be rigid.

The conductive pattern layer 20 and the conductive ground layer 30 are formed of a conductive metal material such as copper.

Figure 2:
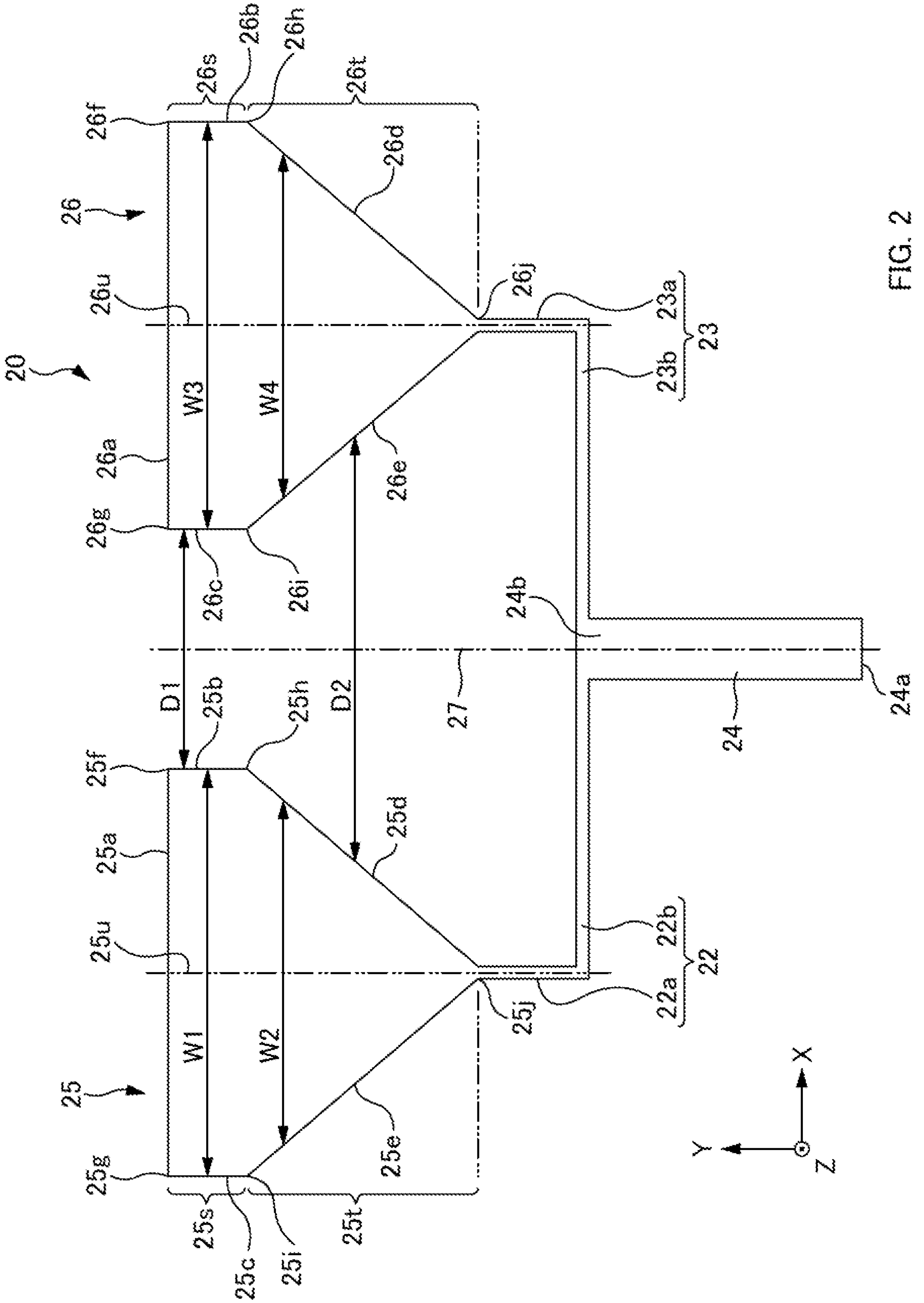
FIG. 2 is a plan view of a conductive pattern layer of the antenna according to the first embodiment.

FIG. 2 is a plan view of the conductive pattern layer 20. FIG. 2 illustrates, as auxiliary lines or symbols representing directions, an X axis, a Y axis, and a Z axis orthogonal to each other. The Z axis is parallel to a thickness direction of the dielectric layer 10, and is perpendicular to a radiation surface (one of the main surfaces of the dielectric layer 10 on which the conductive pattern layer 20 is formed) of the antenna 1.

The conductive pattern layer 20 is shape-processed (patterned) by a subtractive method, an additive method, or the like, for example. In this way, a first feed line 22, a second feed line 23, a transmission line 24, a first radiation element 25, and a second radiation element 26 are formed in the conductive pattern layer 20.

The first radiation element 25 is formed in a pentagon symmetrical with respect to a symmetry line 25*u* parallel to the Y axis through a vertex 25*j*. The symmetry line 25*u* is also a perpendicular line from the vertex 25*j* to an opposite side 25*a*. Hereinafter, the vertex 25*j* is also referred to as a first vertex 25*j*, and the side 25*a* opposite to the first vertex 25*j* is also referred to as a first side 25*a*.

All of sides 25*a*, 25*b*, 25*c*, 25*d*, and 25*e* of the first radiation element 25 are straight lines. The first side 25*a* opposite to the first vertex 25*j* is parallel to the X axis, the sides 25*b* and 25*c* respectively extending from both ends of the first side 25*a* are parallel to the Y axis, and the sides 25*b* and 25*c* have lengths equal to each other. Since the sides 25*b* and 25*c* are parallel to each other, a width W1 in an X-axis direction of a region 25*s* of the first radiation element 25 sandwiched between the sides 25*b* and 25*c* is uniform from vertexes 25*f* and 25*g* to vertexes 25*h* and 25*i*. Hereinafter, the region 25*s* is referred to as a first uniform width part 25*s*.

An interior angle at the vertexes 25*f* and 25*g* at both ends of the first side 25*a* is a right angle. An interior angle at the vertex 25*h* opposite to the vertex 25*f* with respect to the side 25*b* is an obtuse angle, an interior angle at the vertex 25*i* opposite to the vertex 25*g* with respect to the side 25*c* is an obtuse angle, and the interior angle at the vertex 25*h* and the interior angle at the vertex 25*i* are equal to each other. A length of the side 25*d* extending from the vertex 25*h* to the first vertex 25*j* and a length of the side 25*e* extending from the vertex 25*i* to the first vertex 25*j* are equal to each other.

The sides 25*d* and 25*e* are inclined to the first side 25*a* so as to come closer to each other toward the first vertex 25*j*. Thus, a width W2 in the X-axis direction of a region 25*t* of the first radiation element 25 sandwiched between the sides 25*d* and 25*e* gradually decreases in a direction from the first side 25*a* to the first vertex 25*j*, and a maximum width in the region 25*t* is equal to the width W1 of the first uniform width part 25*s*. Hereinafter, the region 25*t* is referred to as a first non-uniform width part 25*t*.

An interior angle at the first vertex 25*j* is an acute angle. However, an interior angle at the first vertex 25*j* may be a right angle or an obtuse angle.

The first radiation element 25 and the second radiation element 26 are arranged in a row in the X-axis direction. Since a shape of the second radiation element 26 and a shape of the first radiation element 25 are symmetrical with respect to a symmetry line 27 that is parallel to the symmetry line 25*u* and is located between the first radiation element 25 and the second radiation element 26, the shape of the second radiation element 26 and the shape of the first radiation element 25 are congruent. Therefore, the second radiation element 26 is formed in a pentagon symmetrical with respect to a symmetry line 26*u* parallel to the Y axis through a vertex 26*j*. The symmetry line 26*u* is also a perpendicular line from the vertex 26*j* to a side 26*a* opposite to the vertex 26*j*. Hereinafter, the vertex 26*j* is also referred to as a second vertex 26*j*, and the side 26*a* opposite to the second vertex 26*j* is also referred to as a second side 26*a*.

The second side 26*a* is parallel to the X axis, and the second side 26*a* and the first side 25*a* are arranged on a straight line. Sides 26*b* and 26*c* respectively extending from both ends of the second side 26*a* are parallel to the Y axis, and the sides 26*b* and 26*c* have lengths equal to each other. Because the sides 26*b* and 26*c* are parallel to each other, a width W3 in the X-axis direction of a region 26*s* of the second radiation element 26 sandwiched between the sides 26*b* and 26*c* is uniform from vertexes 26*f* and 26*g* to vertexes 26*h* and 26*i*. Hereinafter, the region 26*s* is referred to as a second uniform width part 26*s*.

An interior angle at the vertexes 26*f* and 26*g* at both ends of the second side 26*a* is a right angle. An interior angle at the vertex 26*h* opposite to the vertex 26*f* with respect to the side 26*b* is an obtuse angle, an interior angle at the vertex 26*i* opposite to the vertex 26*g* with respect to the side 26*c* is an obtuse angle, and the interior angle at the vertex 26*h* and the interior angle at the vertex 26*i* are equal to each other. A length of a side 26*d* extending from the vertex 26*h* to the second vertex 26*j* and a length of a side 26*e* extending from the vertex 26*i* to the second vertex 26*j* are equal to each other.

The sides 26*d* and 26*e* are inclined with respect to the second side 26*a* so as to come closer to each other toward the second vertex 26*j*. Thus, a width W4 in the X-axis direction of a region 26*t* of the second radiation element 26 sandwiched between the sides 26*d* and 26*e* gradually decreases in a direction from the second side 26*a* to the second vertex 26*j*, and a maximum width in the region 26*t* is equal to the width W3 of the second uniform width part 26*s*. Hereinafter, the region 26*t* is referred to as a second non-uniform width part 26*t*.

An interior angle at the second vertex 26*j* is an acute angle. However, an interior angle at the second vertex 26*j* may be a right angle or an obtuse angle.

The side 25*b* of the first radiation element 25 and the side 26*c* of the second radiation element 26 adjacent to each other are parallel to each other, and an interval D1 between the sides 25*b* and 26*c* is uniform from the vertexes 25*f* and 26*g* to the vertexes 25*h* and 26*i*. Because the widths W2 and W4 of the non-uniform width parts 25*t* and 26*t* of the radiation elements 25 and 26 in the X-axis direction gradually decrease in the direction from the sides 25*a* and 26*a* to the vertexes 25*j* and 26*j*, an interval D2 between the side 25*d* of the first radiation element 25 and the side 26*e* of the second radiation element 26 adjacent to each other gradually increases in the direction from the first side 25*a* to the first vertex 25*j*.

A proximal end portion of the first feed line 22 having an L shape is electrically connected to the first vertex 25*j* of the first radiation element 25. The first feed line 22 linearly extends in a negative Y-axis direction from the first vertex 25*j* of the first radiation element 25, is then bent 90°, and linearly extends in a positive X-axis direction, and an end portion of the first feed line 22 distal from the first radiation element 25 is electrically connected to one end portion 24*b* of the transmission line 24. In other words, the first feed line 22 includes a first feed line part 22*a* linearly extending in the negative Y-axis direction from the first vertex 25*j* of the first radiation element 25, and a second feed line part 22*b* linearly extending in the positive X-axis direction from an end portion of the first feed line part 22*a* distal from the first radiation element 25 to one end portion 24*b* of the transmission line 24.

A proximal end portion of the second feed line 23 having an L shape is electrically connected to the second vertex 26*j* of the second radiation element 26. The second feed line 23 linearly extends in the negative Y-axis direction from the second vertex 26*j* of the second radiation element 26, is then bent 90°, and linearly extends in a negative X-axis direction, and an end portion of the second feed line 23 distal from the second radiation element 26 is electrically connected to one end portion 24*b* of the transmission line 24. In other words, the second feed line 23 includes a third feed line part 23*a* linearly extending in the negative Y-axis direction from the second vertex 26*j* of the second radiation element 26, and a fourth feed line part 23*b* linearly extending in the negative X-axis direction from an end portion of the third feed line part 23a distal from the second radiation element 26 to one end portion 24b of the transmission line 24.

A physical length of the first feed line 22 and a physical length of the second feed line 23 are equal to each other. A physical length of the first feed line part 22a of the first feed line 22 and a physical length of the third feed line part 23a of the second feed line 23 are equal to each other, and a physical length of the second feed line part 22b of the first feed line 22 and a physical length of the fourth feed line part 23b of the second feed line 23 are equal to each other.

A shape of the second feed line 23 and a shape of the first feed line 22 are symmetrical with respect to the symmetry line 27.

The transmission line 24 linearly extends in the negative Y-axis direction from the end portions of the feed lines 22 and 23 distal from the radiation elements 25 and 26. A center line of the transmission line 24 coincides with the symmetry line 27. Another end portion 24a of the transmission line 24 is a feed point. In other words, the end portion 24a of the transmission line 24 is connected to a terminal of a radio frequency integrated circuit (RFIC), which is not illustrated. The RFIC is a transmitter, a receiver, or a transceiver. Note that the transmission line 24 may function as a transformer that achieves impedance matching for the terminal of the RFIC and the feed lines 22 and 23.

The radiation elements 25 and 26 having the shapes as described above are arranged in a row, and thus a range of a radiation direction in which the antenna 1 can strongly transmit and receive a radio wave is wide.

Figure 3:
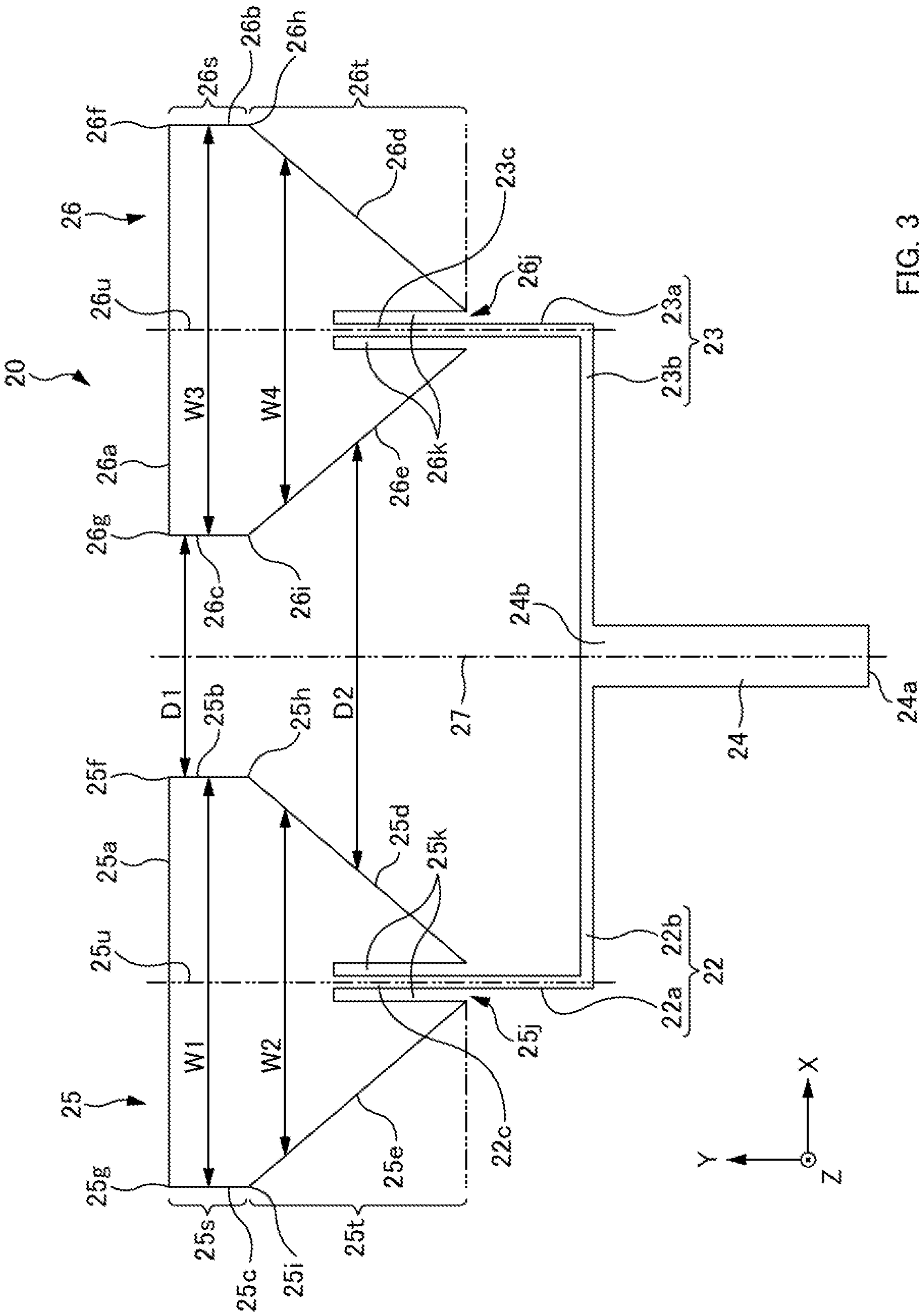
FIG. 3 is a plan view of a conductive pattern layer of an antenna according to a modified example of the first embodiment.

Note that, as illustrated in FIG. 3, notches 25k and 25k made by being cut from the first vertex 25j toward the inside of the first radiation element 25 in parallel with the first feed line part 22a may be formed at the first vertex 25j of the first radiation element 25 on both sides of the first feed line part 22a. Thus, the first feed line part 22a is extended from the first vertex 25j of the first radiation element 25 to the inside of the first radiation element 25, and is electrically connected to the first radiation element 25 via an extended part 22c. Since such notches 25k and 25k are formed, impedance matching is achieved between the first feed line 22 and the first radiation element 25. Similarly, notches 26k and 26k made by being cut from the second vertex 26j toward the inside of the second radiation element 26 in parallel with the third feed line part 23a may be formed at the second vertex 26j of the second radiation element 26 on both sides of the third feed line part 23a, and the third feed line part 23a may be extended from the second vertex 26j of the second radiation element 26 to the inside of the second radiation element 26, and be electrically connected to the second radiation element 26 via an extended part 23c. The extended parts 22c and 23c have lengths equal to each other.

Second Embodiment

Figure 4:
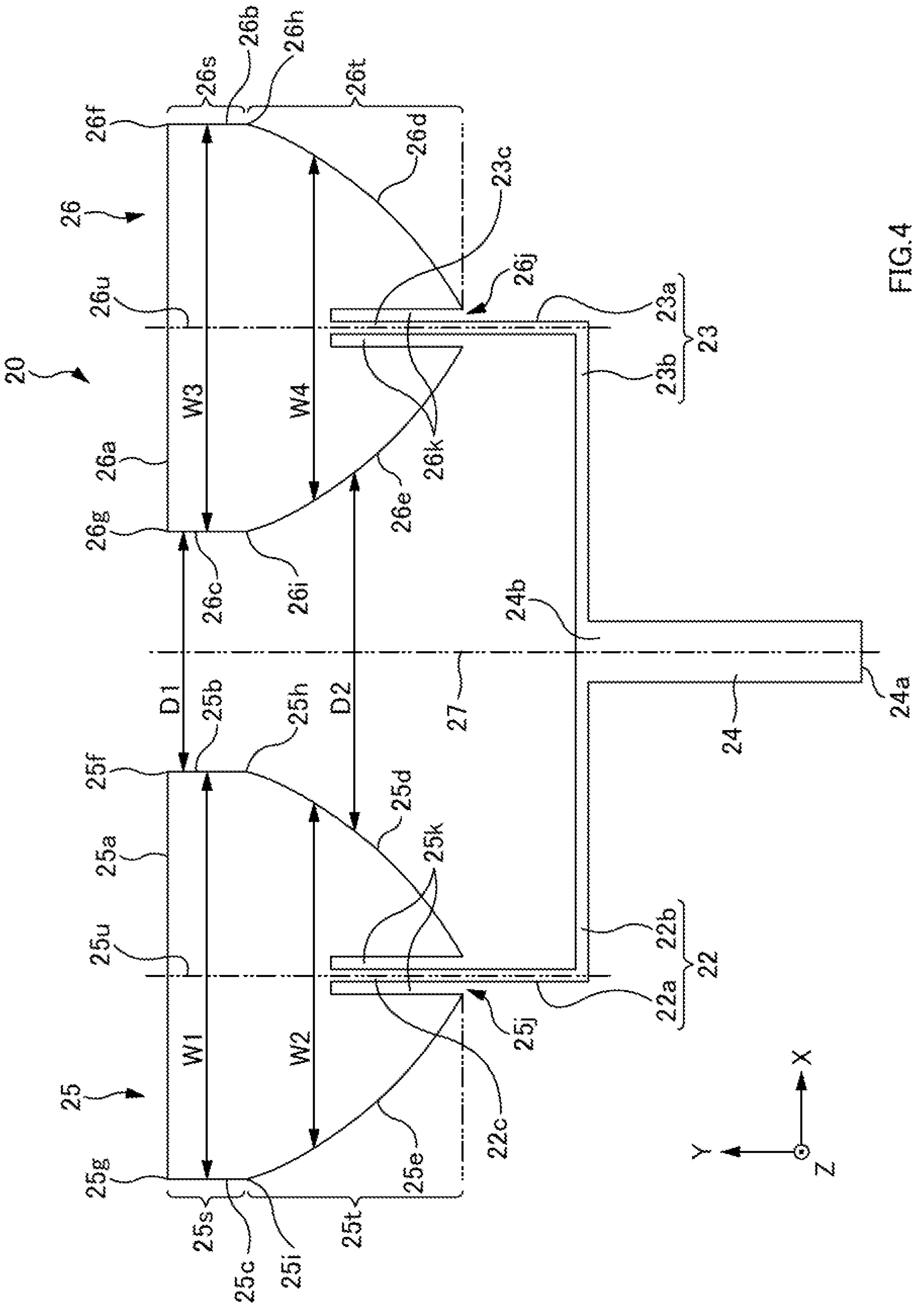
FIG. 4 is a plan view of a conductive pattern layer of an antenna according to a second embodiment.

FIG. 4 is a plan view of a conductive pattern layer 20 of an antenna according to a second embodiment. Hereinafter, a difference between the antenna according to the second embodiment and the antenna according to the modified example (refer to FIG. 3) of the first embodiment will be described. A corresponding portion between the antenna according to the second embodiment and the antenna according to the modified example of the first embodiment is provided with the same reference sign.

In the modified example of the first embodiment, all of the sides 25a, 25b, 25c, 25d, and 25e of the first radiation element 25 are straight lines. In contrast, in the second embodiment, sides 25d and 25e being both side parts of a first non-uniform width part 25t of a first radiation element 25 are formed in a curved convex shape Similarly, sides 26d and 26e being both side parts of a second non-uniform width part 26t of a second radiation element 26 are formed in a curved convex shape. Even when the sides 25d and 25e have a curved shape, a width W2 of the first non-uniform width part 25t in the X-axis direction gradually decreases in a direction from a first side 25a to a first vertex 25j. Even when the sides 26d and 26e have a curved shape, a width W4 of the second non-uniform width part 26t in the X-axis direction gradually decreases in a direction from a second side 26a to a second vertex 26j. The corresponding portion between the antenna according to the second embodiment and the antenna 1 according to the modified example of the first embodiment is similarly provided except for the point described above.

The radiation elements 25 and 26 having the shapes as described above are arranged in a row, and thus a range of a radiation direction in which the antenna according to the second embodiment can strongly transmit and receive a radio wave is wide.

Third Embodiment

Figure 5:
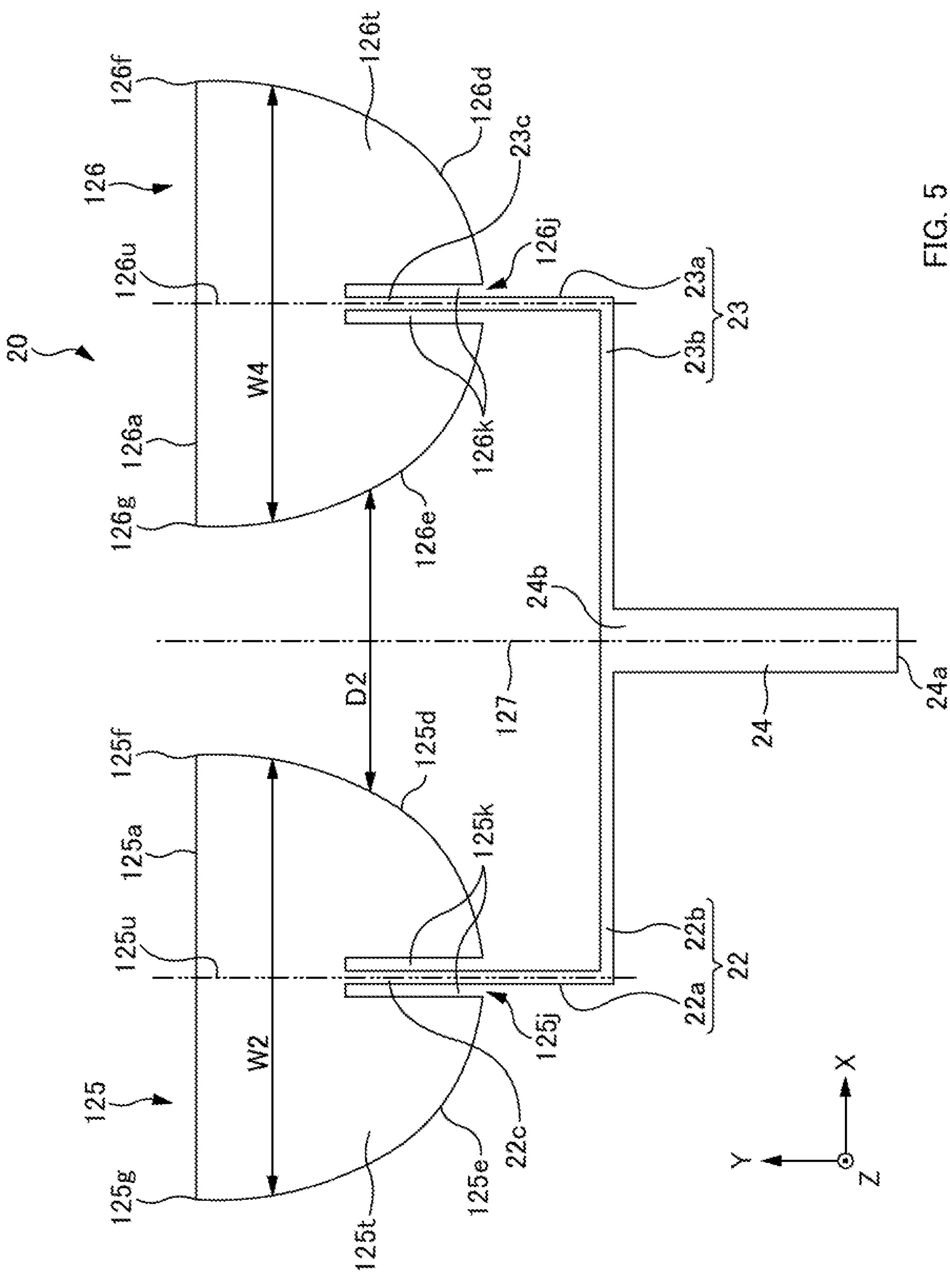
FIG. 5 is a plan view of a conductive pattern layer of an antenna according to a third embodiment.

FIG. 5 is a plan view of a conductive pattern layer 20 of an antenna according to a third embodiment. Hereinafter, a difference between the antenna according to the third embodiment and the antenna according to the modified example (refer to FIG. 3) of the first embodiment will be described.

In the modified example of the first embodiment, the first radiation element 25 and the second radiation element 26 are formed in a pentagon. In contrast, in the third embodiment, a first radiation element 125 and a second radiation element 126 are formed in a semicircle, a semi-ellipse, or a shape close to the semicircle or the semi-ellipse. Hereinafter, shapes of the first radiation element 125 and the second radiation element 126 will be described in detail.

The first radiation element 125 includes a first vertex part 125j, and a first side 125a opposite to the first vertex part 125j. A perpendicular line from the first vertex part 125j to the first side 125a is a symmetry line 125u, and the first radiation element 125 is formed in a semicircle, a semi-ellipse, or a shape close to the semicircle or the semi-ellipse symmetrical with respect to the symmetry line 125u. The first side 125a is formed linearly in parallel to the X axis.

A side 125d extends from one end 125f of the first side 125a to the first vertex part 125j and is curved, and a side 125e extends from another end 125g of the side 125a to the first vertex part 125j and is curved. The sides 125d and 125e are formed in a curved convex shape. Thus, the first radiation element 125 is formed of only a first non-uniform width part 125t, and a width W2 of the first non-uniform width part 125t in the X-axis direction gradually decreases in a direction from the first side 125a to the first vertex part 125j.

The first radiation element 125 and the second radiation element 126 are arranged in a row in the X-axis direction. Because a shape of the second radiation element 126 and a shape of the first radiation element 125 are symmetrical with respect to a symmetry line 127 that is parallel to the symmetry line 125u and is located between the first radiation element 125 and the second radiation element 126, the shape of the second radiation element 126 and the shape of the first radiation element 125 are congruent. Therefore, the second radiation element 126 has a shape symmetrical with respect to a symmetry line 126u parallel to the Y axis and goes through a vertex part 126j. The symmetry line 126u is also a perpendicular line from the second vertex part 126*j* to a second side 126*a* opposite to the second vertex part 126*j*.

A side 126*d* extending from one end 126*f* of the second side 126*a* to the second vertex part 126*j* is formed in a curved convex shape. A side 126*e* extending from another end 126*g* of the second side 126*a* to the second vertex part 126*j* is formed in a curved convex shape. Thus, the second radiation element 126 is formed of only a second non-uniform width part 126*t*, and a width W4 of the second non-uniform width part 126*t* in the X-axis direction gradually decreases in a direction from the second side 126*a* to the second vertex part 126*j*. An interval D2 between the side 125*d* of the first radiation element 125 and the side 126*e* of the second radiation element 126 adjacent to each other gradually increases in the direction from the first side 125*a* to the first vertex part 125*j*.

A proximal end portion of a first feed line 22 having an L shape is electrically connected to the first vertex part 125*j* of the first radiation element 125, and a proximal end portion of a second feed line 23 having an L shape is electrically connected to the second vertex part 126*j* of the second radiation element 126. Because shapes of the first feed line 22, the second feed line 23, and a transmission line 24 are the same as those in the modified example of the first embodiment, detailed description thereof will be omitted.

Notches 125*k* and 125*k* made by being cut from the first vertex part 125*j* toward the inside of the first radiation element in parallel with a first feed line part 22*a* are formed at the first vertex part 125*j* of the first radiation element 125 on both sides of the first feed line part 22*a* of the first feed line 22. Similarly, notches 126*k* and 126*k* made by being cut in parallel with a third feed line part 23*a* are also formed on both sides of the third feed line part 23*a* of the second feed line 23.

The radiation elements 125 and 126 having the shapes as described above are arranged in a row, and thus a range of a radiation direction in which the antenna according to the third embodiment can strongly transmit and receive a radio wave is wide.

Comparative Example

Figure 6:
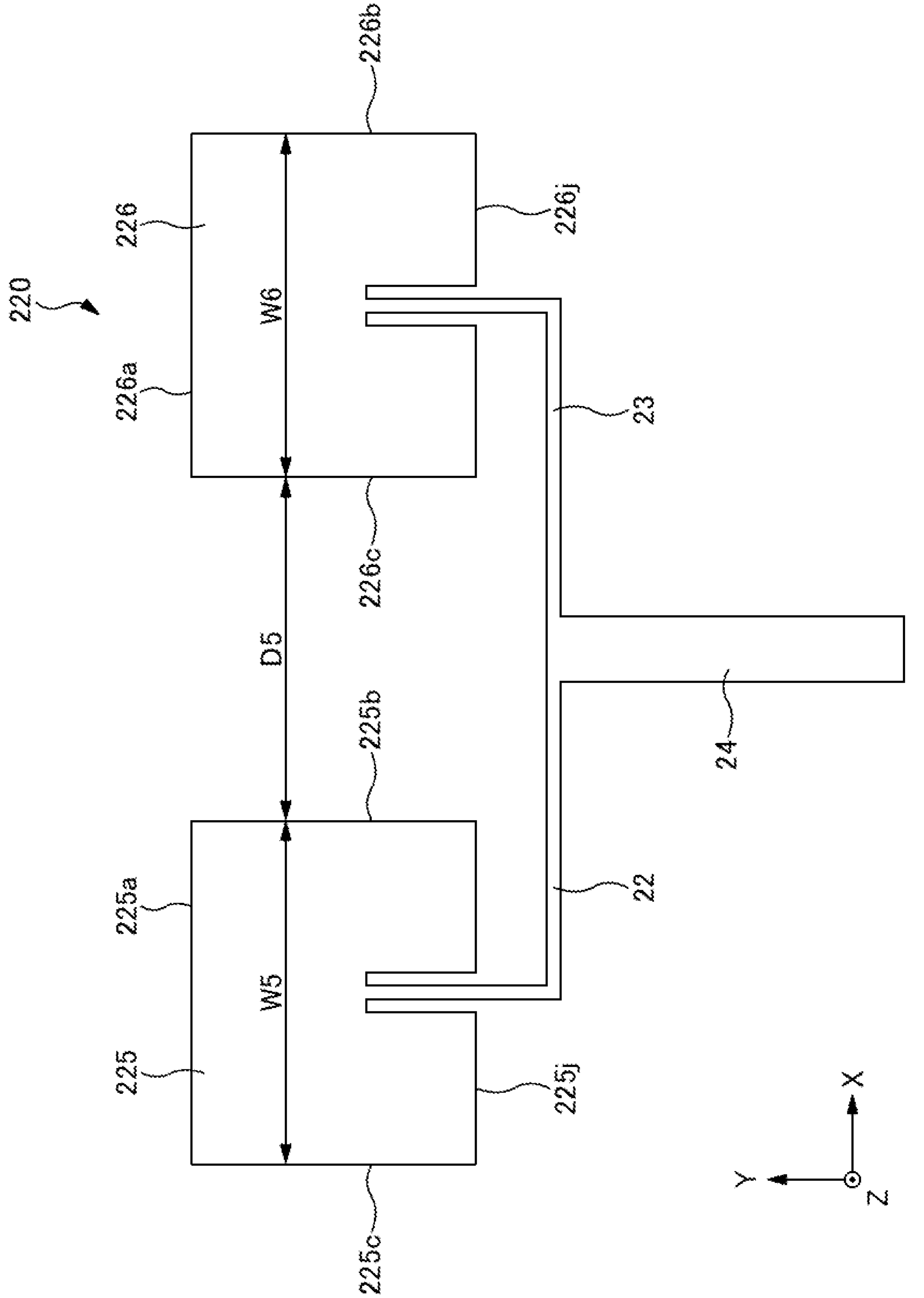
FIG. 6 is a plan view of a conductive pattern layer of an antenna according to a fourth embodiment.

FIG. 6 is a plan view of a conductive pattern layer 220 of an antenna according to a comparative example. As illustrated in FIG. 6, in the comparative example, a shape of radiation elements 225 and 226 arranged in a row in the X-axis direction is a rectangular shape. Sides 225*a* and 225*j* of the first radiation element 225 parallel to each other are parallel to the X axis, other sides 225*b* and 225*c* parallel to each other are parallel to the Y axis, and a width W5 of the first radiation element 225 in the X-axis direction is uniform. Sides 226*a* and 226*j* of the second radiation element 226 parallel to each other are parallel to the X axis, other sides 226*b* and 226*c* parallel to each other are parallel to the Y axis, and a width W6 of the second radiation element 226 in the X-axis direction is uniform. An interval D5 between the first radiation element 225 and the second radiation element 226 is uniform.

A radiation range of the antenna according to the first to third embodiments is wider than that of the antenna in the comparative example. Hereinafter, a radiation range of the antenna according to the first to third embodiments being wider and a radiation range of the antenna according to the comparative example being narrower are verified by a simulation.

<Verification>

Figure 7:
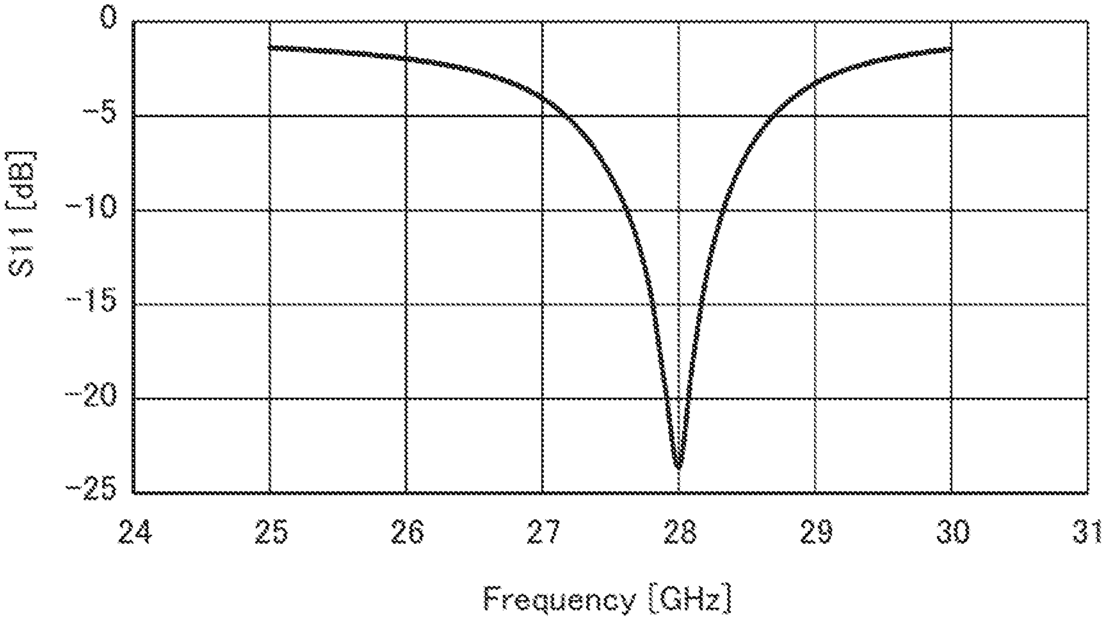
FIG. 7 is a graph illustrating a relationship between a reflection coefficient and a frequency of the antenna according to the modified example of the first embodiment.

FIG. 7 is a graph illustrating a simulation result of a relationship between a reflection coefficient and a frequency of the antenna 1 according to the modified example of the first embodiment. As illustrated in FIG. 7, the antenna according to the modified example of the first embodiment has a frequency characteristic such that a reflection coefficient S11 of an S parameter takes a minimum value at a frequency of 28 [GHz].

Figure 8:
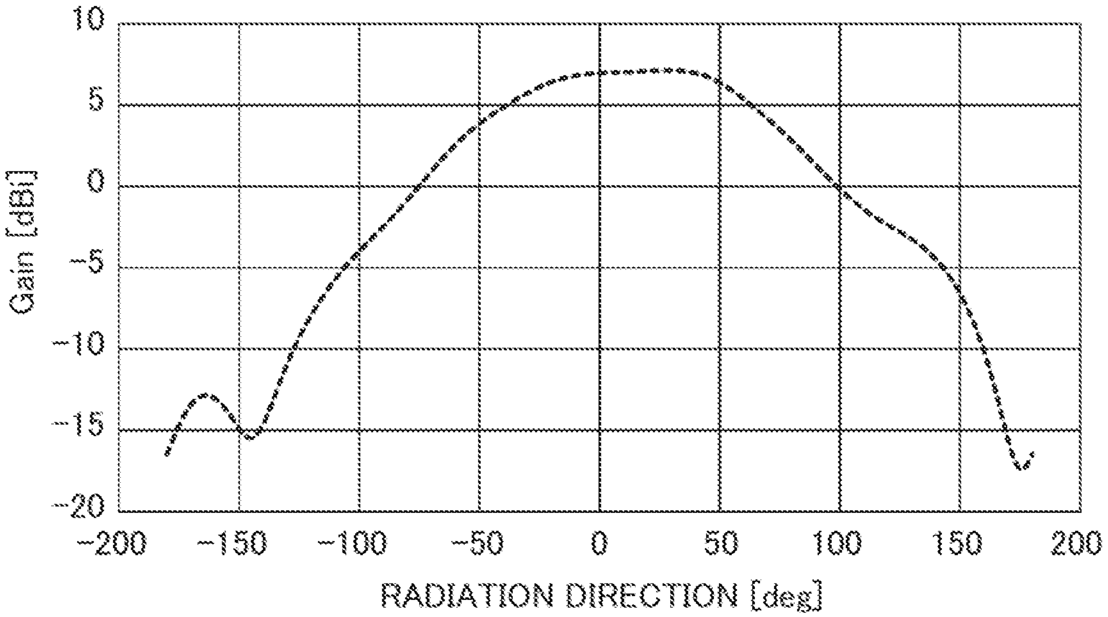
FIG. 8 is a graph illustrating a relationship between a gain and a radiation direction of the antenna according to the modified example of the first embodiment.

FIG. 8 is a graph illustrating a simulation result of directivity of a radio wave at 28 [GHz] radiated by the antenna according to the modified example of the first embodiment. A horizontal axis indicates an angle with reference to the Z axis on a YZ plane, and a vertical axis indicates a gain. As illustrated in FIG. 8, a radiation direction achieving a maximum gain of 7.14 [dBi] is −30 [degree], and a range of a radiation direction in which a gain is within −3.00 [dBi] from the maximum gain is from −49.15 to +71.54 [degree].

Figure 9:
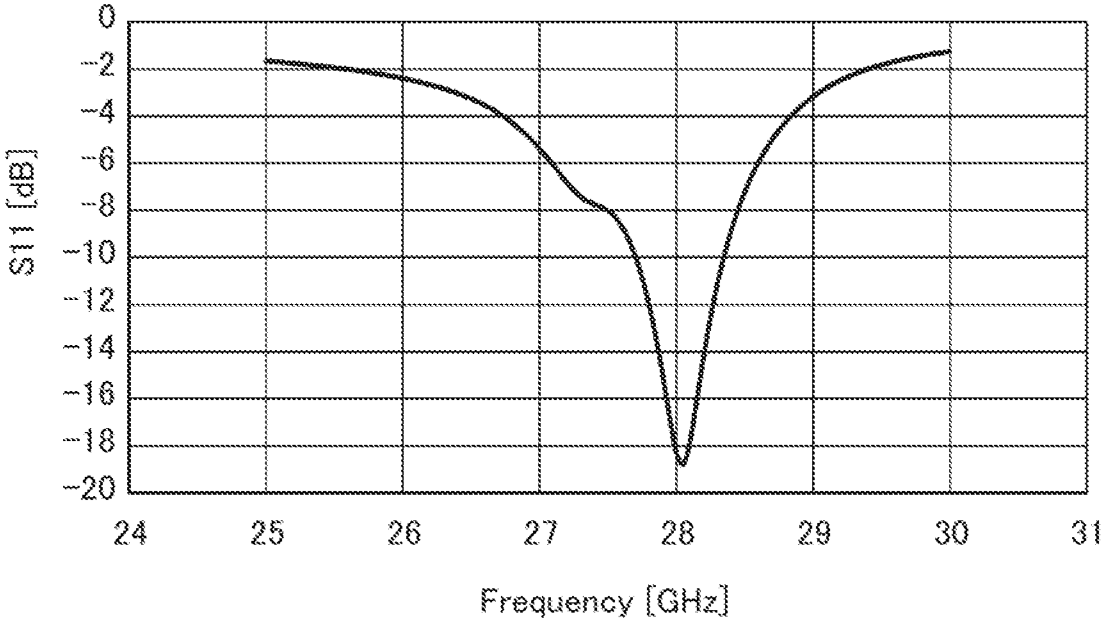
FIG. 9 is a graph illustrating a relationship between a reflection coefficient and a frequency of the antenna according to the second embodiment.

FIG. 9 is a graph illustrating a simulation result of a relationship between a reflection coefficient and a frequency of the antenna according to the second embodiment. As illustrated in FIG. 9, the antenna according to the second embodiment has a frequency characteristic such that a reflection coefficient S11 of an S parameter takes a minimum value near a frequency of 28 [GHz].

Figure 10:
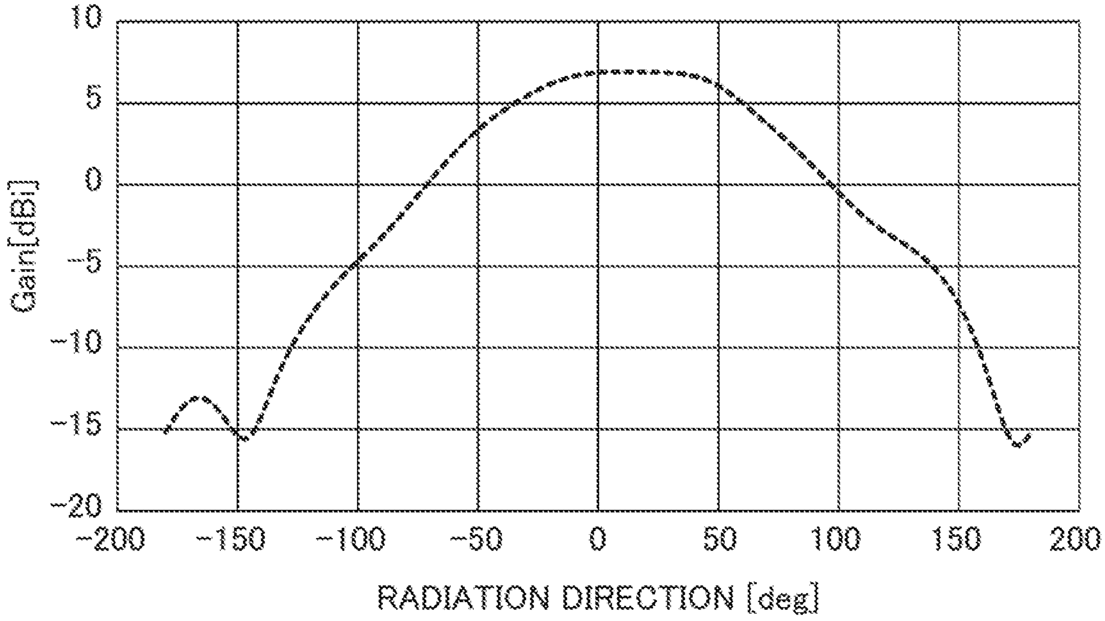
FIG. 10 is a graph illustrating a relationship between a gain and a radiation direction of the antenna according to the second embodiment.

FIG. 10 is a graph illustrating a simulation result of directivity of a radio wave at 28 [GHz] radiated by the antenna according to the second embodiment. A horizontal axis indicates an angle with reference to the Z axis on the YZ plane, and a vertical axis indicates a gain. As illustrated in FIG. 10, a radiation direction achieving a maximum gain of 6.92 [dBi] is 8 [degree], and a range of a radiation direction in which a gain is within −3.00 [dBi] from the maximum gain is from −45.12 to +68.47 [degree].

Figure 11:
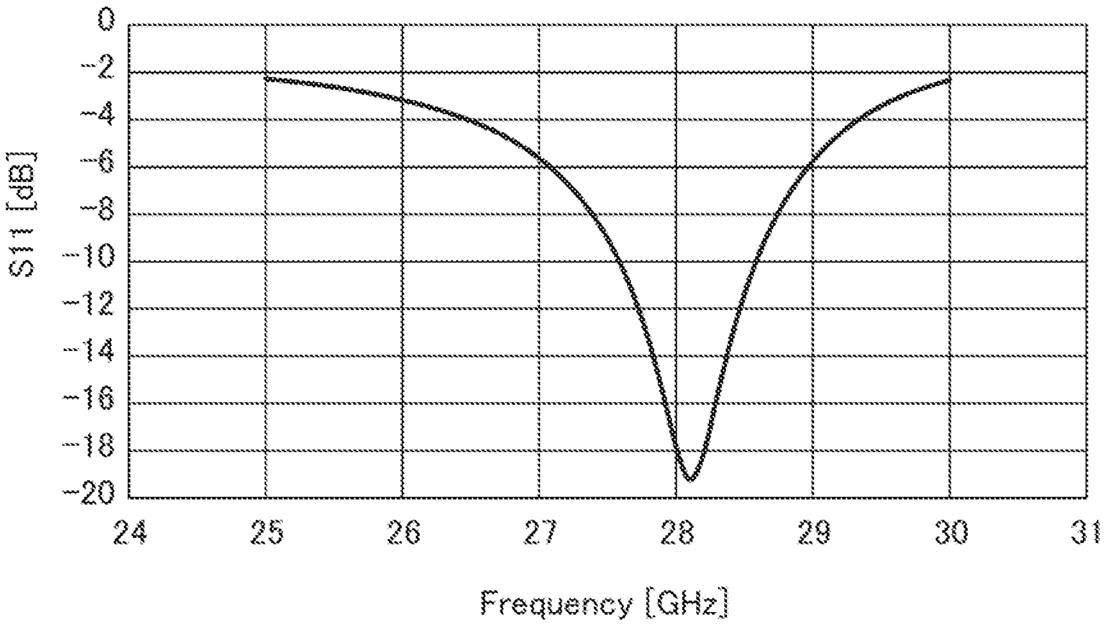
FIG. 11 is a graph illustrating a relationship between a reflection coefficient and a frequency of the antenna according to the third embodiment.

FIG. 11 is a graph illustrating a simulation result of a relationship between a reflection coefficient and a frequency of the antenna according to the third embodiment. As illustrated in FIG. 11, the antenna according to the third embodiment has a frequency characteristic such that a reflection coefficient S11 of an S parameter takes a minimum value near a frequency of 28 [GHz].

Figure 12:
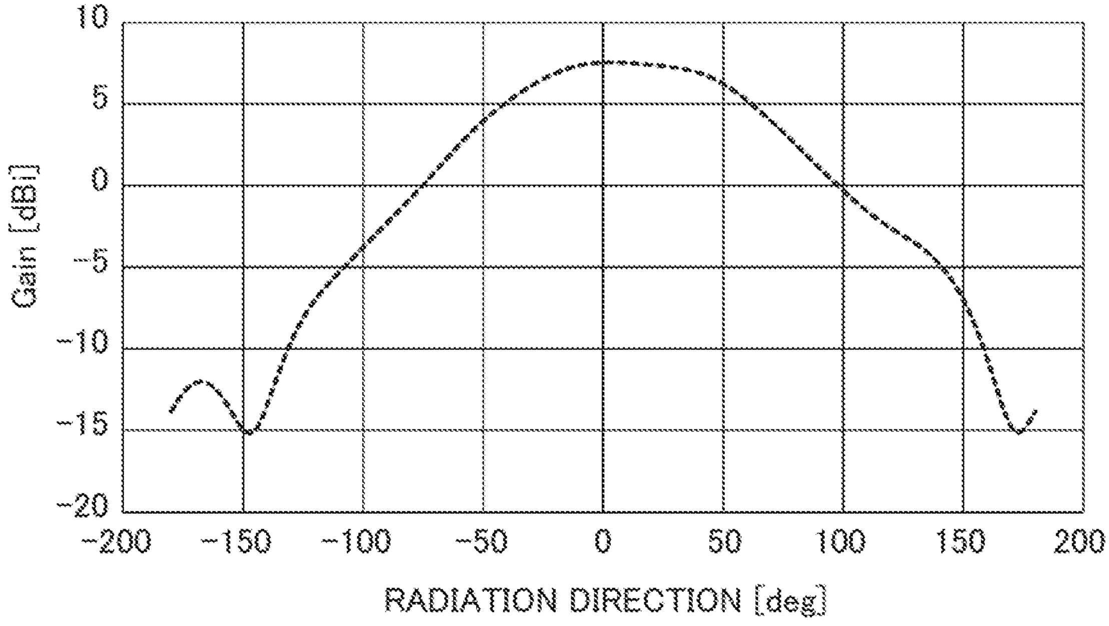
FIG. 12 is a graph illustrating a relationship between a gain and a radiation direction of the antenna according to the third embodiment.

FIG. 12 is a graph illustrating a simulation result of directivity of a radio wave at 28 [GHz] radiated by the antenna according to the third embodiment. A horizontal axis indicates an angle with reference to the Z axis on the YZ plane, and a vertical axis indicates a gain. As illustrated in FIG. 11, a radiation direction achieving a maximum gain of 7.55 [dBi] is 2 [degree], and a range of a radiation direction in which a gain is within −3.00 [dBi] from the maximum gain is from −45.38 to +65.45 [degree].

Figure 13:
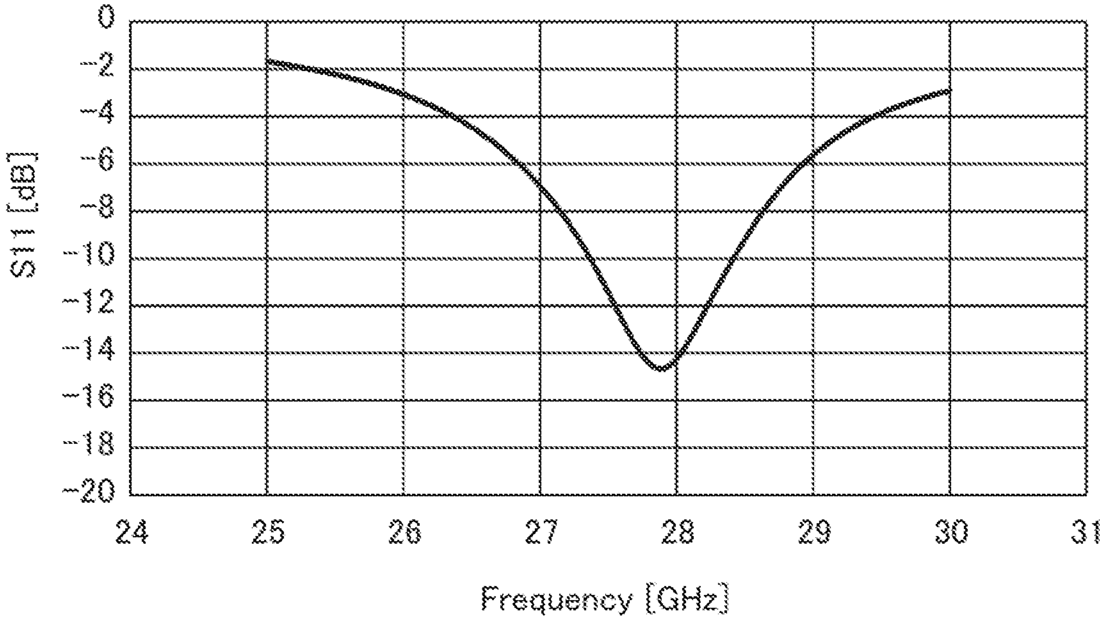
FIG. 13 is a graph illustrating a relationship between a reflection coefficient and a frequency of an antenna according to a comparative example.

FIG. 13 is a graph illustrating a simulation result of a relationship between a reflection coefficient and a frequency of the antenna according to the comparative example.

As illustrated in FIG. 13, the antenna according to the comparative example has a frequency characteristic such that a reflection coefficient S11 of an S parameter takes a minimum value near a frequency of 28 [GHz].

Figure 14:
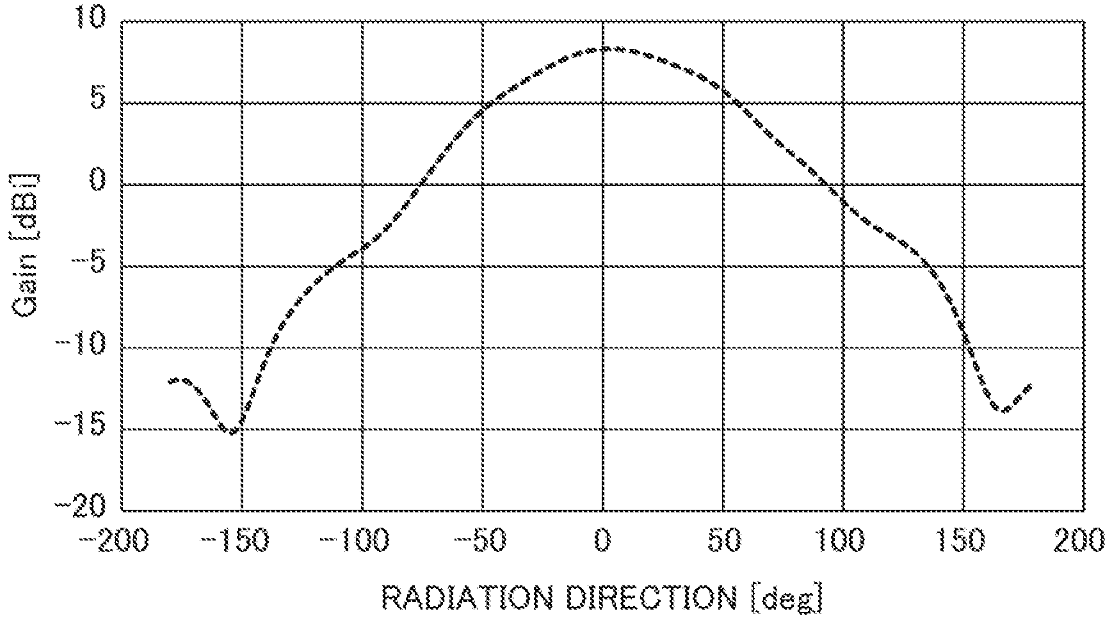
FIG. 14 is a graph illustrating a relationship between a gain and a radiation direction of the antenna according to the fourth embodiment.

FIG. 14 is a graph illustrating a simulation result of directivity of a radio wave at 28 [GHz] radiated by the antenna according to the comparative example. A horizontal axis indicates an angle with reference to the Z axis on the YZ plane, and a vertical axis indicates a gain. As illustrated in FIG. 14, a radiation direction achieving a maximum gain of 8.34 [dBi] is 2 [degree], and a range of a radiation direction in which a gain is within −3.00 [dBi] from the maximum gain is from −43.22 to +53.66 [degree].

It is clear from the simulation result above that a range of the radiation direction of the antenna 1 according to the modified example of the first embodiment is the widest. It is clear that a range of the radiation direction of the antenna according to the second embodiment is the second widest. It is clear that a range of the radiation direction of the antenna according to the third embodiment is the third widest. It is clear that a range of the radiation direction of the antenna according to the comparative example is the narrowest.

REFERENCE SIGNS LIST

1: Antenna;
10: Dielectric layer;
22: First feed line;
23: Second feed line;
24: Transmission line;
25: First radiation element;
25*a*: Side;
25*j*: Vertex;
25*s*: First uniform width part;
25*t*: First non-uniform width part;
26: Second radiation element;
26*a*: Side;
26*j*: Vertex;
26*s*: Second uniform width part;
26*t*: Second non-uniform width part;
30: Conductive ground layer;
125: First radiation element;
125*a*: Side;
125*j*: Vertex part;
125*t*: First non-uniform width part;
126: Second radiation element;
126*a*: Side;
126*j*: Vertex part;
126*t*: Second non-uniform width part.

The invention claimed is:

1. An antenna comprising:

a dielectric layer including a first main surface and a second main surface opposite to the first main surface;

a conductive ground layer formed on the first main surface;

a first radiation element that is formed on the second main surface and is conductive; and a second radiation element that is formed side by side with the first radiation element on the second main surface and is conductive, wherein the first radiation element includes a first non-uniform width part having a width in a direction parallel to a first side in a linear shape opposed to a first vertex part, the width of the first non-uniform width part gradually decreasing in a direction from the first side to the first vertex part, and the second radiation element includes a second non-uniform width part having a width in a direction parallel to a second side in a linear shape opposed to a second vertex part, the width of the second non-uniform width part gradually decreasing in a direction from the second side to the second vertex part, wherein the first non-uniform width part includes the first vertex part, the first radiation element includes a first uniform width part continuous from the first non-uniform width part toward the first side, the first uniform width part includes the first side, and a width of the first uniform width part is uniform in the direction parallel to the first side, the second non-uniform width part includes the second vertex part, the second radiation element includes a second uniform width part continuous from the second non-uniform width part toward the second side, and the second uniform width part includes the second side, and a width of the second uniform width part is uniform in the direction parallel to the second side.

2. The antenna according to claim 1, wherein a side of both side parts of the first non-uniform width part is formed in a linear shape, and a side of both side parts of the second non-uniform width part is formed in a linear shape.

3. The antenna according to claim 1, wherein sides of the first non-uniform width part in both side parts are formed in a curved shape, and sides of the second non-uniform width part in both side parts are formed in a curved shape.

4. The antenna according to claim 1, wherein the first radiation element has a shape that is line symmetric with respect to a perpendicular line from the first vertex part to the first side, and the second radiation element has a shape that is line symmetric with respect to a perpendicular line from the second vertex part to the second side.

5. The antenna according to claim 1, wherein the second side and the first side are arranged on a straight line.

6. The antenna according to claim 5, wherein the first radiation element and the second radiation element are symmetrical with respect to a symmetry line located between the first radiation element and the second radiation element and perpendicular to the first side.

7. The antenna according to claim 1, further comprising:

a first feed line that is formed on the second main surface, extends from the first vertex part, and is conductive;

a second feed line that is formed on the second main surface, extends from the second vertex part, is electrically connected to an end portion of the first feed line distal from the first radiation element, and is conductive; and a transmission line that extends from the end portion of the first feed line distal from the first radiation element and an end portion of the second feed line distal from the second radiation element, and is conductive.

8. The antenna according to claim 7, wherein the transmission line extends perpendicularly to the first side from the end portion of the first feed line distal from the first radiation element and the end portion of the second feed line distal from the second radiation element in a direction from the first side to the first vertex part, and the first radiation element and the second radiation element are line symmetrical with respect to a center line of the transmission line, and the first feed line and the second feed line are line symmetrical with respect to the center line of the transmission line.

9. An antenna comprising:

a dielectric layer including a first main surface and a second main surface opposite to the first main surface;

a conductive ground layer formed on the first main surface;

a first radiation element that is formed on the second main surface and is conductive; and a second radiation element that is formed side by side with the first radiation element on the second main surface and is conductive, wherein the first radiation element includes a first non-uniform width part having a width in a direction parallel to a first side in a linear shape opposed to a first vertex part, the width of the first non-uniform width part gradually decreasing in a direction from the first side to the first vertex part, and the second radiation element includes a second non-uniform width part having a width in a direction parallel to a second side in a linear shape opposed to a second vertex part, the width of the second non-uniform width part gradually decreasing in a direction from the second side to the second vertex part, wherein sides of the first non-uniform width part in both side parts are formed in a curved shape, and sides of the second non-uniform width part in both side parts are formed in a curved shape.

10. An antenna comprising:

a dielectric layer including a first main surface and a second main surface opposite to the first main surface;

a conductive ground layer formed on the first main surface;

a first radiation element that is formed on the second main surface and is conductive; and a second radiation element that is formed side by side with the first radiation element on the second main surface and is conductive, wherein the first radiation element includes a first non-uniform width part having a width in a direction parallel to a first side in a linear shape opposed to a first vertex part, the width of the first non-uniform width part gradually decreasing in a direction from the first side to the first vertex part, and the second radiation element includes a second non-uniform width part having a width in a direction parallel to a second side in a linear shape opposed to a second vertex part, the width of the second non-uniform width part gradually decreasing in a direction from the second side to the second vertex part, wherein the first radiation element has a shape that is line symmetric with respect to a perpendicular line from the first vertex part to the first side, and the second radiation element has a shape that is line symmetric with respect to a perpendicular line from the second vertex part to the second side.

* * * * *